Figure 6:
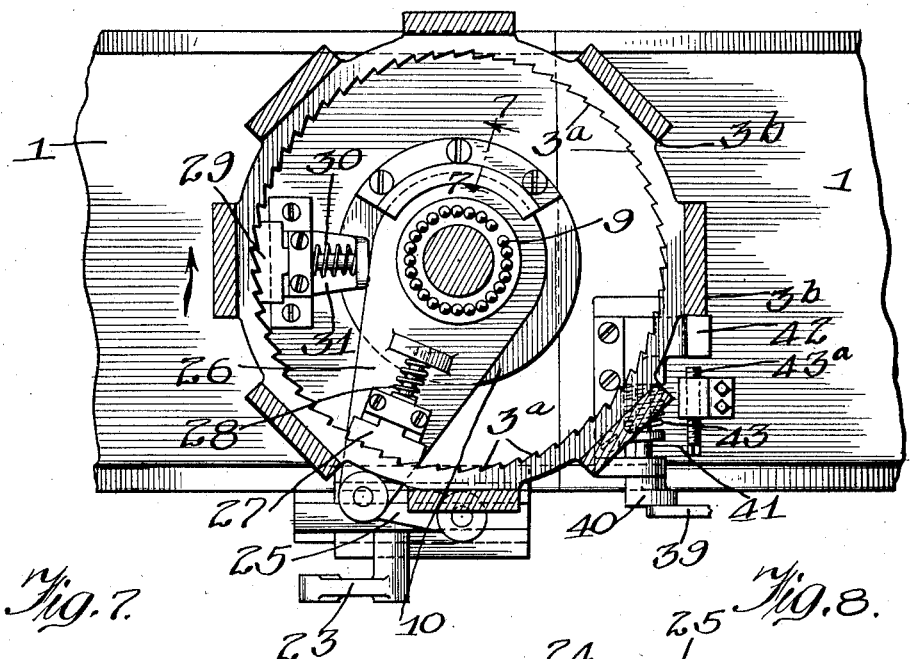

F. K. CASWELL.
BRAKE SHOE MACHINE.
APPLICATION FILED DEC. 17, 1906.
1,003,231.
Patented Sept. 12, 1911.
10 SHEETS—SHEET 1.
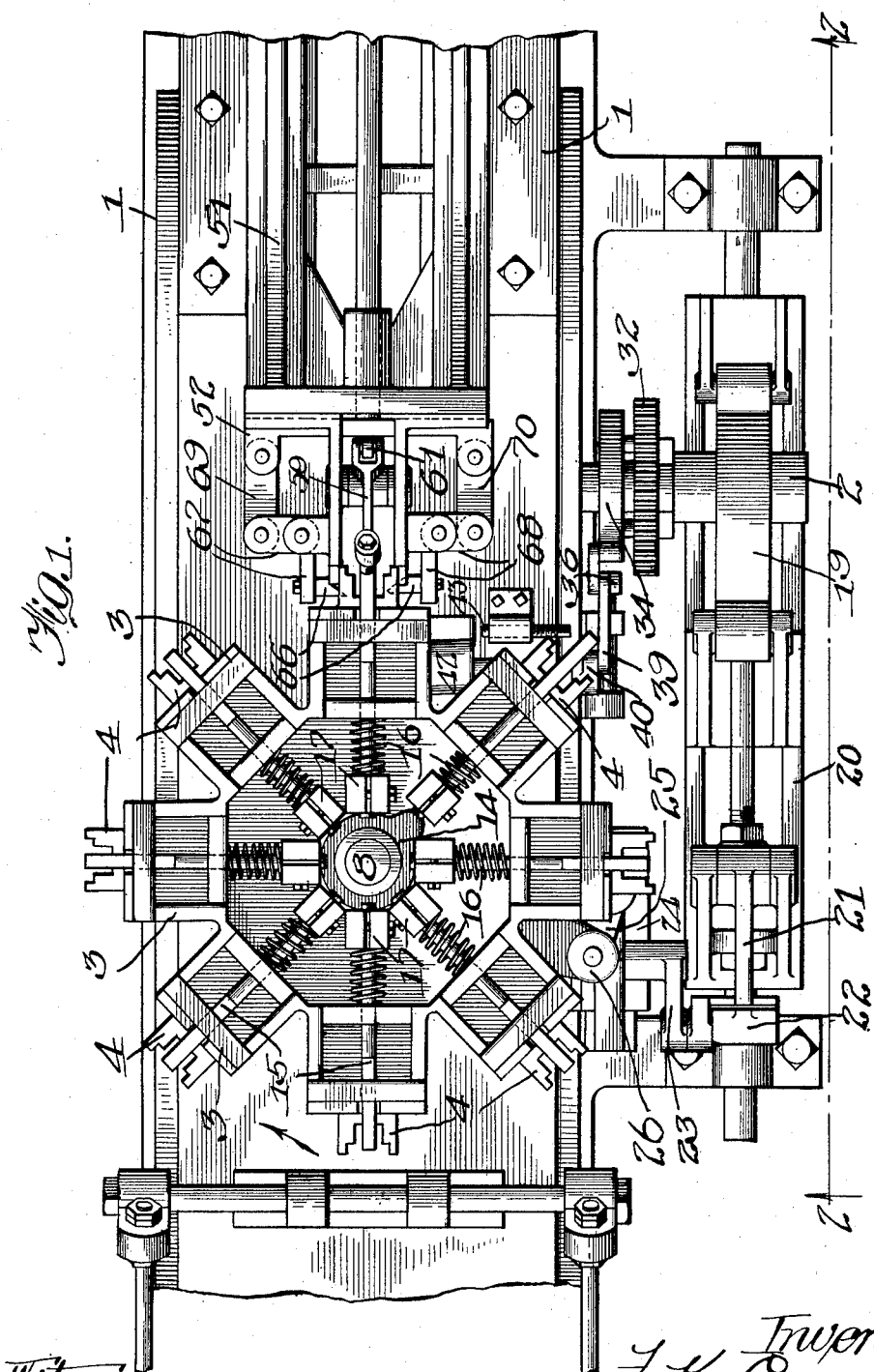
Witnesses:
Inventor:
F. K. Caswell F. K. CASWELL.
BRAKE SHOE MACHINE.
APPLICATION FILED DEC. 17, 1906.
1,003,231.
Patented Sept. 12, 1911.
10 SHEETS—SHEET 2.
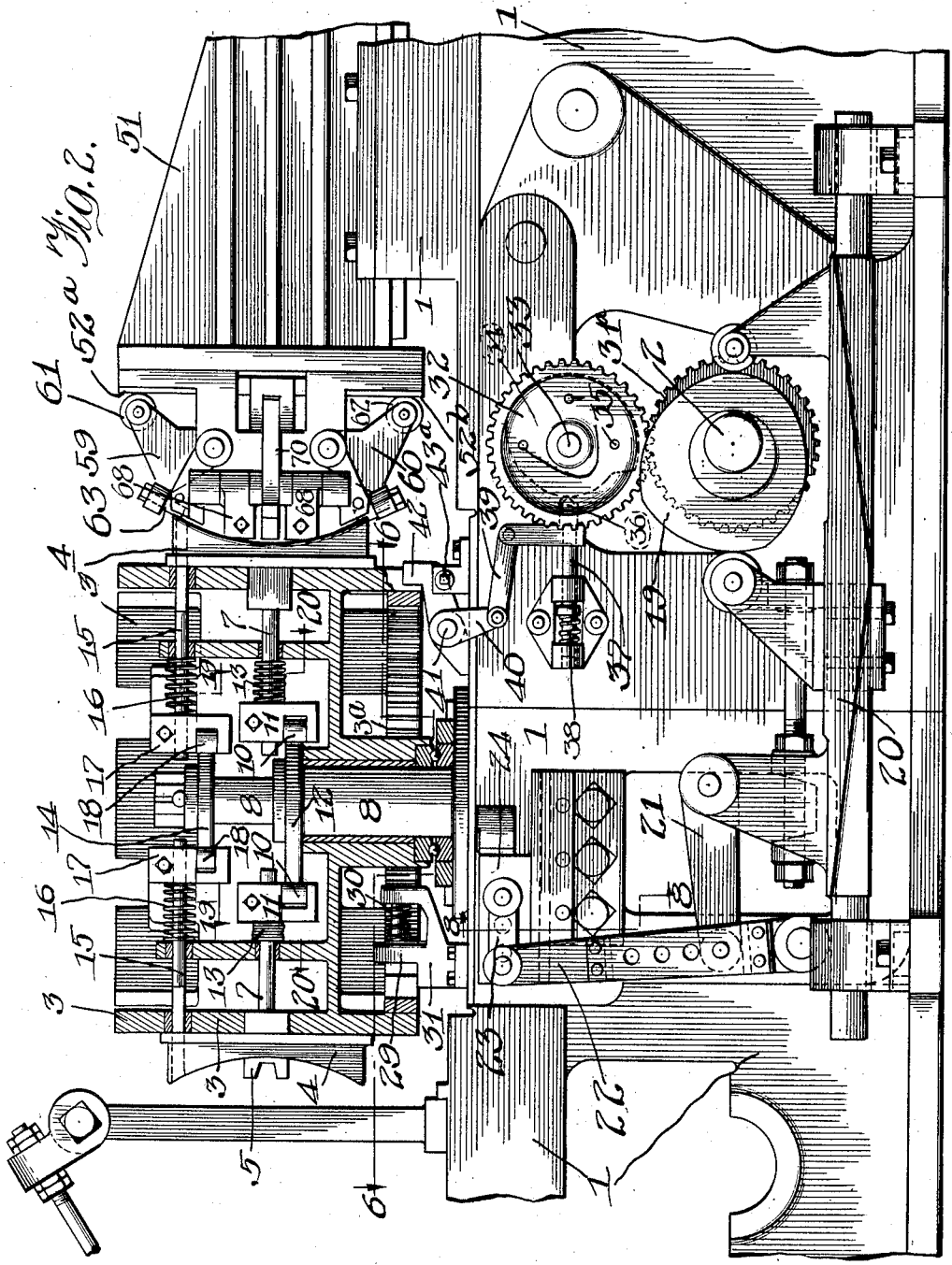

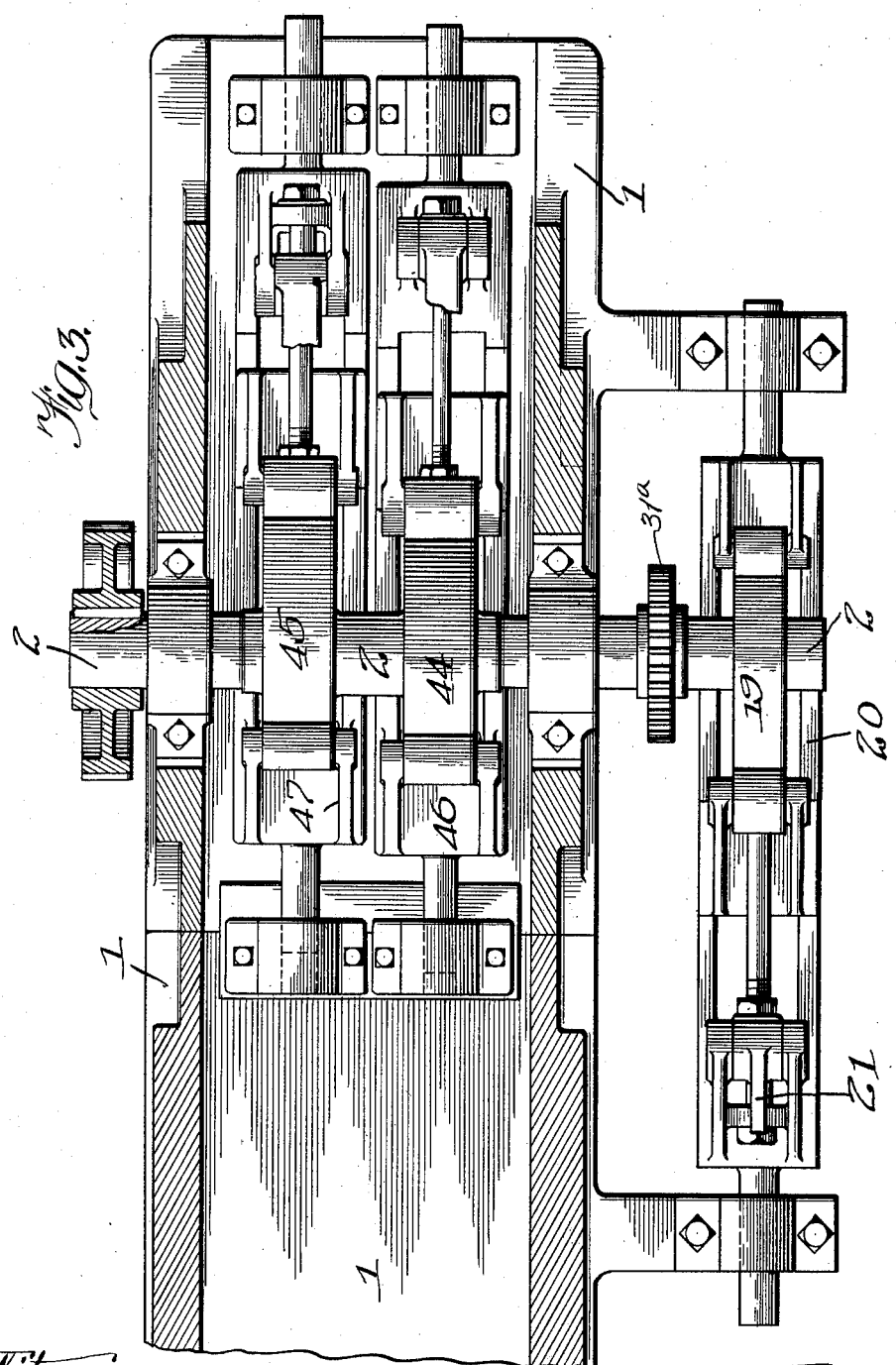

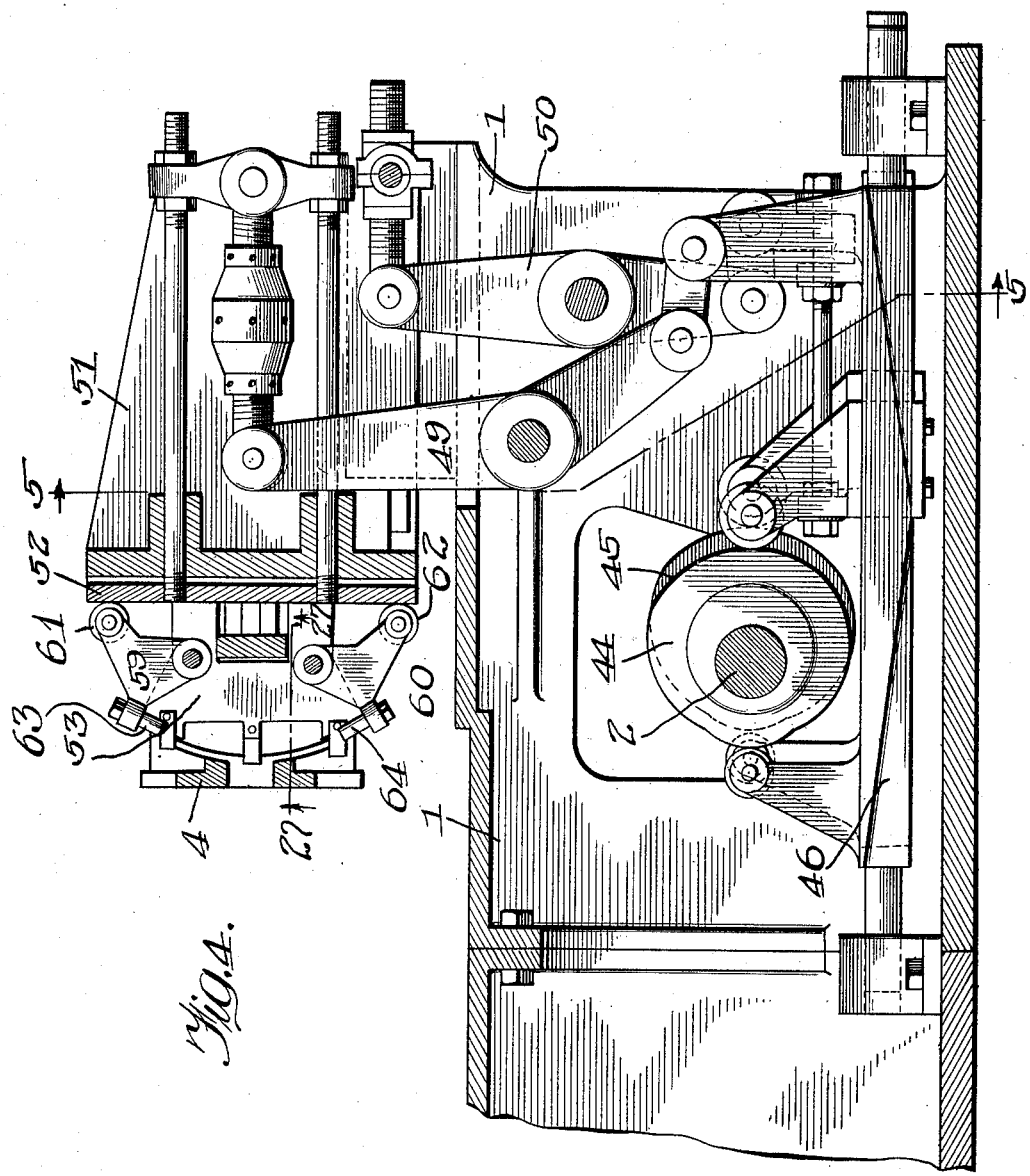

F. K. CASWELL.
BRAKE SHOE MACHINE.
APPLICATION FILED DEC. 17, 1906.
1,003,231.
Patented Sept. 12, 1911.
10 SHEETS—SHEET 5.
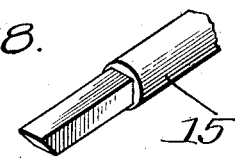
Fig. 18.
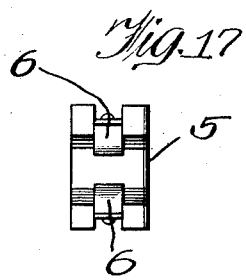
Fig. 17.
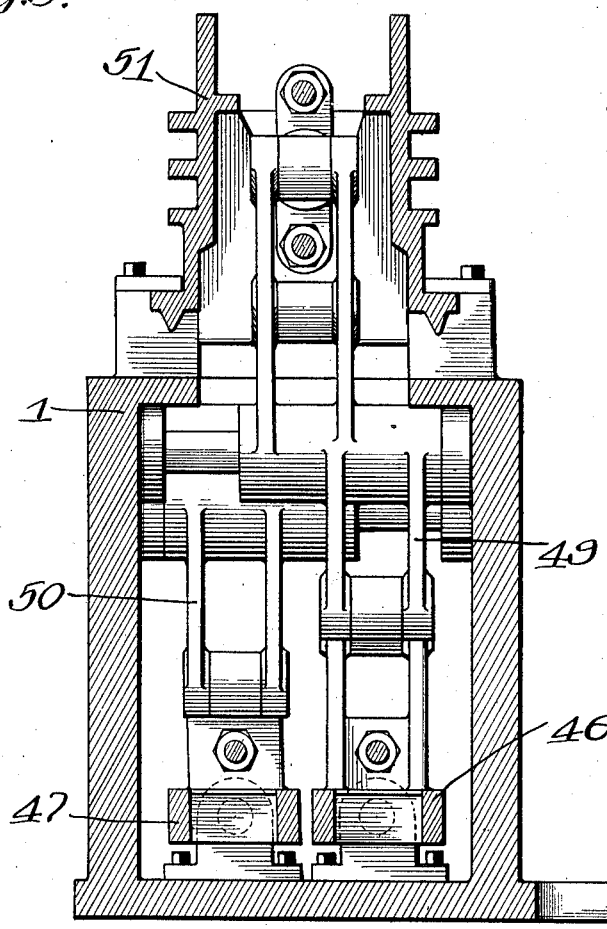
Fig. 5.
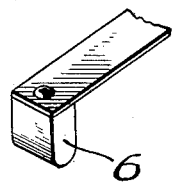
Fig. 16.
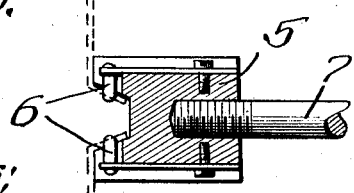
Fig. 15.
Witnesses:
L. V. Domarus
H. Sprinkle
Inventor:
F. K. Caswell,
by Brown & Darby Hopkins
Attys.
COLUMBIA PLANOGRAPH CO., WASHINGTON, D. C.

F. K. CASWELL.
BRAKE SHOE MACHINE.
APPLICATION FILED DEC. 17, 1906.

1,003,231.

Patented Sept. 12, 1911.
10 SHEETS—SHEET 6.

Witnesses:
G. V. Domarus
H. Sprinkle

Inventor:
F. K. Caswell
By Brown & Darby & Hopkins
Attys

F. K. CASWELL.
BRAKE SHOE MACHINE.
APPLICATION FILED DEC. 17, 1906.
1,003,231.
Patented Sept. 12, 1911.
10 SHEETS—SHEET 7.
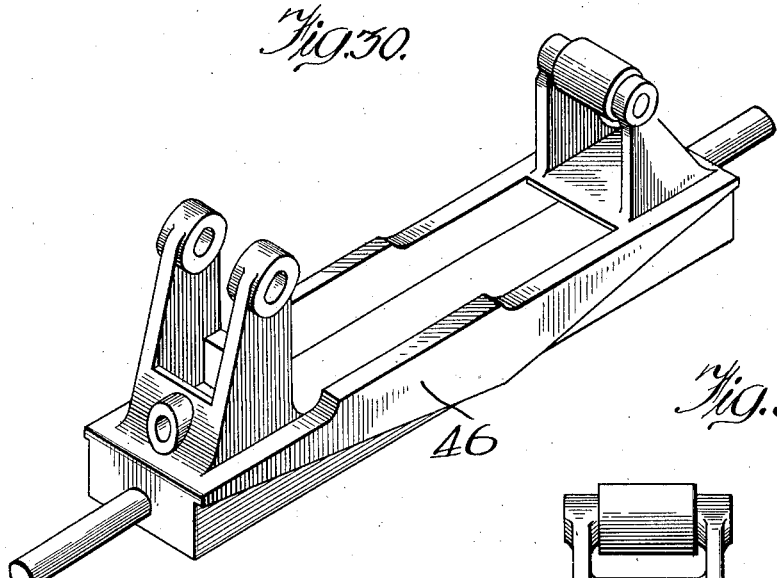
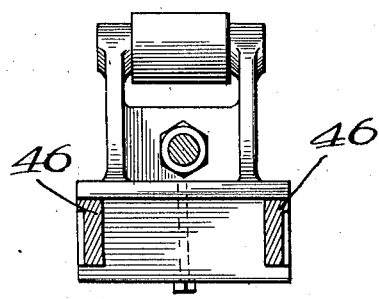
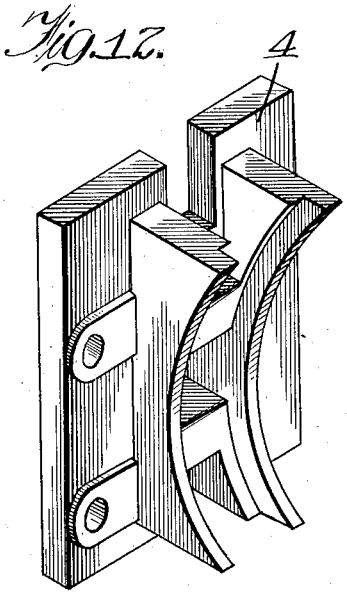
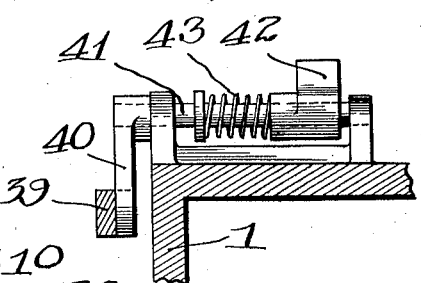
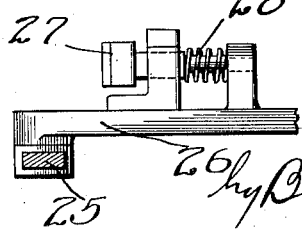

F. K. CASWELL.
BRAKE SHOE MACHINE.
APPLICATION FILED DEC. 17, 1906.
1,003,231.
Patented Sept. 12, 1911.
10 SHEETS—SHEET 8.
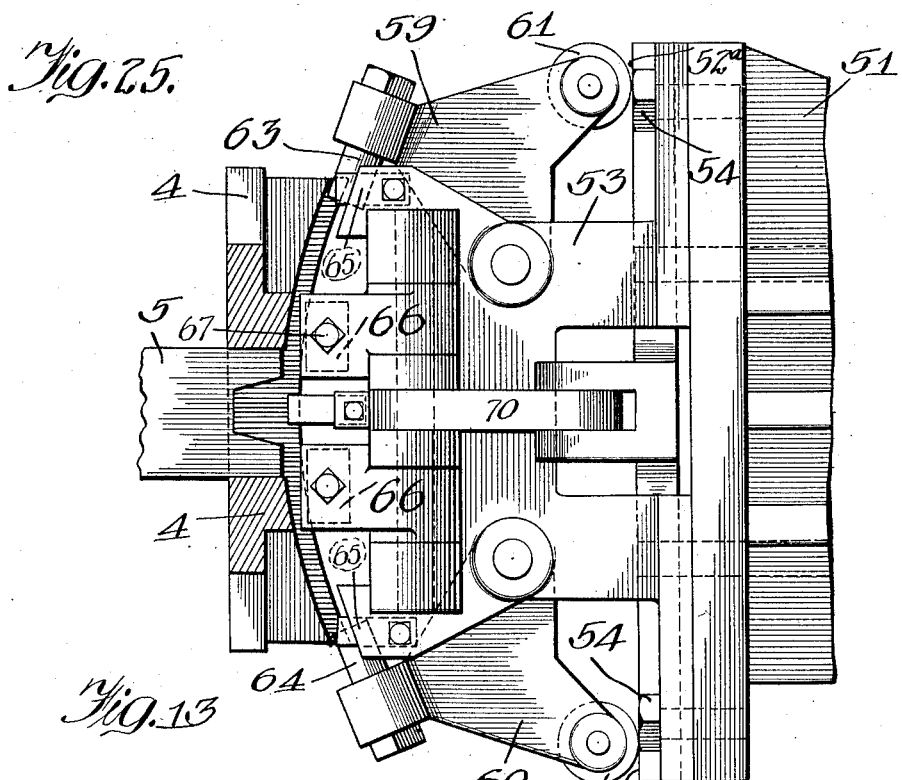
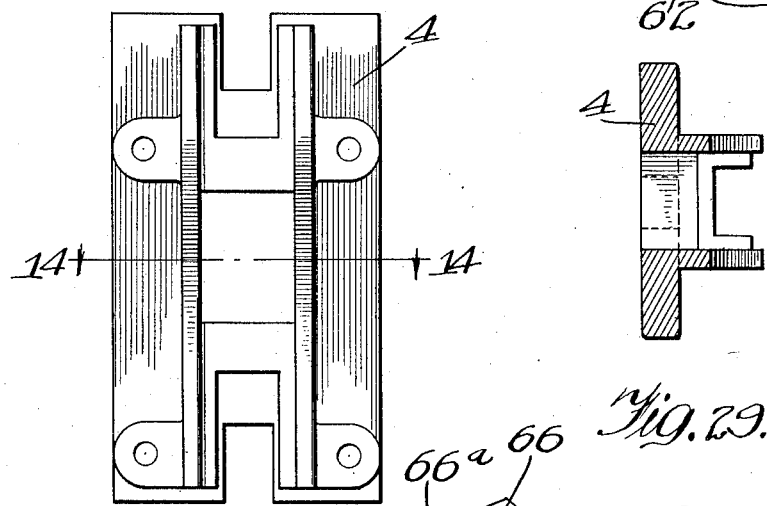
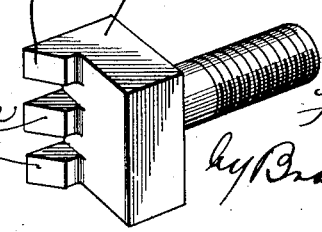
Witnesses:
Inventor:
F. K. Caswell

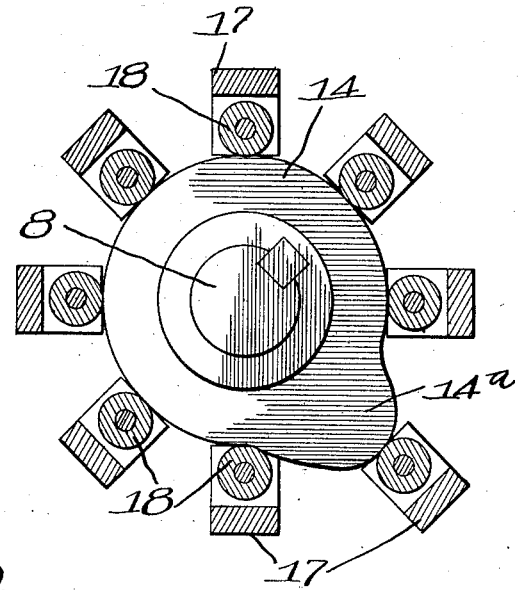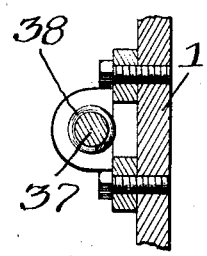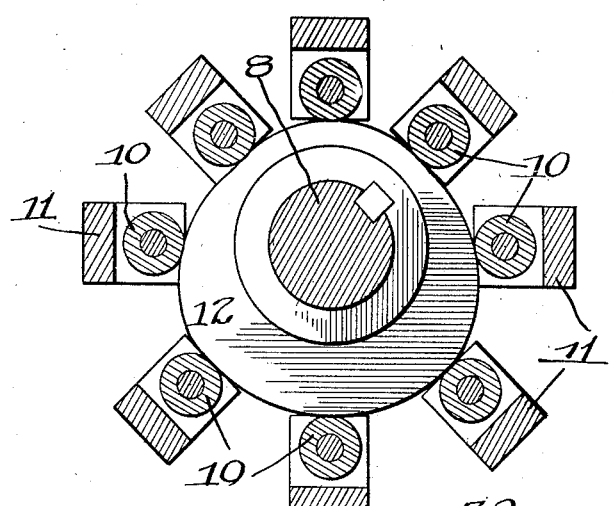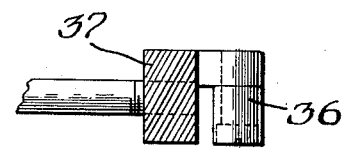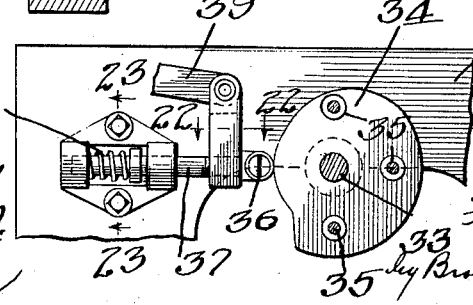

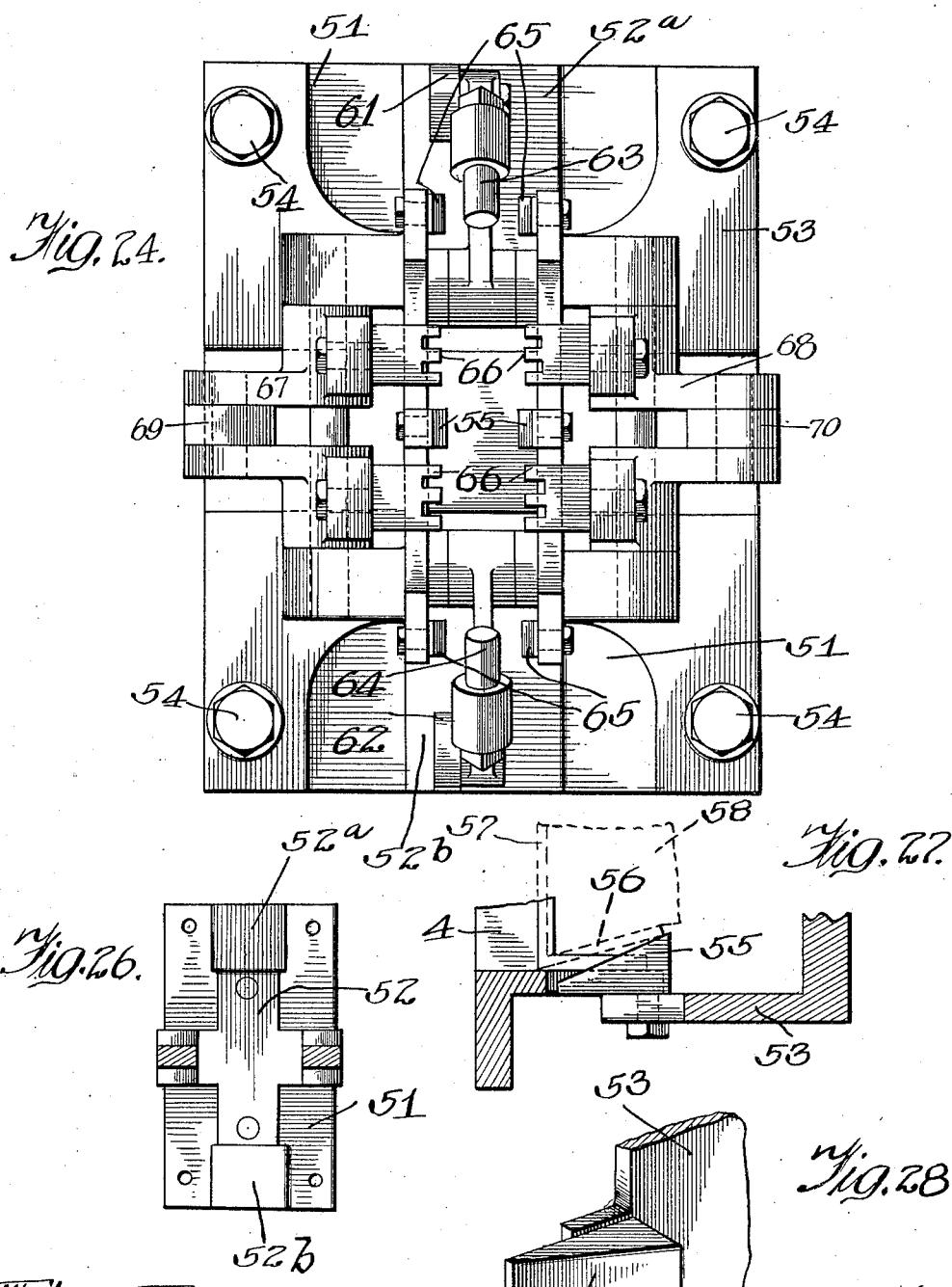

UNITED STATES PATENT OFFICE.

FREDERICK K. CASWELL, OF LOS ANGELES, CALIFORNIA, ASSIGNOR TO PAUL DICKINSON (INCORPORATED), OF CHICAGO, ILLINOIS, A CORPORATION OF WYOMING.

BRAKE-SHOE MACHINE.

1,003,231.     Specification of Letters Patent.     Patented Sept. 12, 1911.

Application filed December 17, 1906. Serial No. 348,178.

*To all whom it may concern:*

Be it known that I, FREDERICK K. CASWELL, a citizen of the United States, residing at Los Angeles, in the county of Los Angeles and State of California, have invented certain new and useful Improvements in Brake-Shoe Machines, of which the following is a full, clear, and exact specification.

The invention relates to machines for making brake-shoes and more particularly to machines of the general class described in my co-pending application on automatic brake shoe machines of which the specific mechanism of the present invention forms a part, although as it will appear hereinafter from the specification, machines embodying this invention may be used independently of other mechanisms in the manufacture of brake-shoes.

The primary object of the invention is to provide an improved machine adapted to receive brake shoe-shells or holders and to retain them while filling material is inserted therein and to provide suitable mechanism for performing a series of operations on the shells resulting in the closing of the walls on the filling material and otherwise permanently securing the filling within the shells.

A further object of the invention is to provide an improved machine for performing the work indicated that is adapted to be used in connection with automatic punching and forming machines for producing brake-shoe shells and in connection with suitable automatic mechanism for inserting blocks or bodies of filling into the shells.

A further object of the invention is to provide an improved machine for performing the work indicated that is adapted to receive brake-shoe shells formed of sheet metal and to coöperate with mechanism for inserting blocks or bodies of filling material into the shells under sufficient pressure to impart the necessary degree of curvature to the shells to cause them to conform to the curvature of the braking surface of car wheels.

A further object of the invention is to provide an improved machine for performing the indicated work of closing the walls of the shells on the filling material and otherwise firmly securing the filling within the shell, that is adapted to be used independently of other mechanisms if desired.

Figure 7:
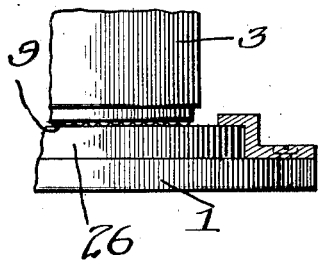
Figure 8:
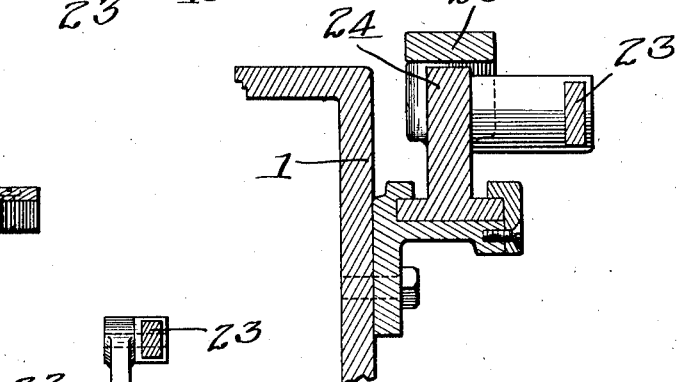
Figure 9:
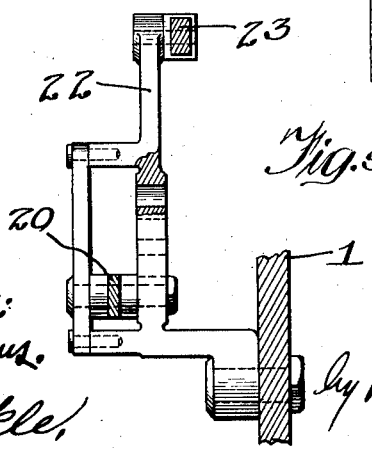

To the attainment of these ends and the accomplishment of other new and useful objects as will appear, the invention consists in the features of novelty in the construction, combination and arrangement of the several parts, hereinafter more fully described and claimed and shown in the accompanying drawings, illustrating an exemplification of this invention and in which:

Figure 1 is a plan view of the machine. In order that the view might show the parts of sufficient size to be clearly distinguishable, portions at each end of the machine are broken away. Fig. 2 is a side elevation of the machine and taken on the line 2—2 of Fig. 1. In this view the turret wheel is shown in vertical section in order to disclose more fully the operative parts on the interior thereof. Fig. 3 is a horizontal sectional plan view of the machine with the upper parts broken away, disclosing the main driving shaft and the contiguous mechanism, consisting of the eccentrically mounted cams and the reciprocating driving members which coöperate with these cams. Fig. 4 is a longitudinal, vertical sectional view through the main frame and the compound reciprocating head or ram. This view discloses the mechanism which operates the compound head or ram. Fig. 5 is a transverse, vertical sectional view on line 5—5, Fig. 4. Fig. 6 is a horizontal sectional view through the rotating turret wheel. This view was taken approximately on line 6—6, Fig. 2, and discloses the mechanism used in driving and controlling the turret wheel. Fig. 7 is a detail view of a portion of the base of the turret wheel and the adjacent parts by which it is carried on the main frame. This view shows a portion of the pivotally mounted swinging arm or lever on which the spring mounted pawl is carried for actuating the turret wheel. The retaining bracket for this lever is shown in section. Fig. 8 is a detail sectional view on the line 8—8, Fig. 2, showing the construction of parts which operate the turret wheel ratchet mechanism. Fig. 9 is a detail view of the swinging lever, and parts adjacent thereto, which operates the mechanism referred to in Fig. 8. Fig. 10 is a detail sectional view on a line passing perpendicularly through the link 25 as shown in Fig. 6 and shows this link in section and also a portion in elevation of the oscillating lever 26 and the pawl mechanism carried thereby, all of which parts form a portion of the means employed in giving rotation to the turret wheel. Fig. 11 is a detail view of the stop pawl and adjacent parts, which has for its function to stop the rotation of the turret wheel during the interval that mechanism adjacent to the turret wheel is operating on parts carried thereby. Fig. 12 is an enlarged perspective view of one of the holders mounted on the periphery of the turret wheel. In the present embodiment of the invention the turret wheel is constructed to carry eight of such holders on its periphery. Fig. 13 is a front elevation view of the part shown in Fig. 12. Fig. 14 is a sectional view on line 14—14, Fig. 13. Fig. 15 is an enlarged detail view of the means employed to retain a brake-shoe shell within the holder shown in Figs. 12 and 13. Figs. 16 and 17 are further detailed illustrations of parts shown in Fig. 15. Fig. 18 is a detail view of a portion of the outer end of one of the reciprocating discharge pins controlled by the cam mechanism illustrated in Fig. 19 (see Fig. 2). Fig. 20 is a detail view of the eccentrically mounted cam carried on the axle of the turret wheel and adapted to control the movement of the shell retaining means. (See Figs. 2, 15, 16 and 17). Fig. 21 is a detail of the means operating stop pawl controlling the turret wheel already referred to in Fig. 11. Fig. 22 is a detail sectional view on line 22—22 Fig. 21. Fig. 23 is a detail sectional view on line 23—23 Fig. 21. Fig. 24 is an enlarged front elevation view of the compound reciprocating head or ram and the mechanism carried thereon for folding, compressing and securing the filler within the shell. Fig. 25 is a side elevation view of the parts shown in Fig. 24 with the addition of a broken portion of the turret wheel. Fig. 26 is a front elevation of the head or ram with the operative parts stripped in order to show the auxiliary head or ram which is carried by the main head but has an independent movement. Fig. 27 is a detail sectional view of one of the side bending dies and adjacent parts and is taken approximately on line 27—27 Fig. 4. In this view a broken portion of a brake shoe is shown in dotted lines during the operation of bending the side member inwardly on the filling material. Fig. 28 is a detail perspective view of the side bending punch shown in Fig. 27. Fig. 29 is a detail perspective view of one of the dies adapted to cut and punch retaining members from the side walls of the shell into the filling material. Fig. 30 is a detail perspective view of one of the reciprocating driving members operated by eccentrically mounted cams on the main driving shaft. In the machine it will be seen there are three of these members, two for driving the compound head or ram and one for operating the turret wheel mechanism. Fig. 31 is a detail view of the adjustable roller carrying bracket mounted on driving member as shown in Fig. 30, the frame of the driving member being shown in transverse section.

The main frame of the machine is indicated by the numeral 1 in the drawings. This frame on account of the nature of the machine is required to be very heavy. It is preferably cast in as small a number of sections as possible, although it will be apparent that it may be divided into convenient sections and firmly secured together, thus furnishing a substantial support for the operative mechanism carried thereby.

2 is the main driving shaft from which the operative parts receive their movements.

The operative mechanism may conveniently be divided into two groups: first, the rotating turret wheel, the mechanism carried thereby and the mechanism for operating the same; second, the compound reciprocating head or ram, the mechanism carried thereby for folding the walls of the shell on the filling material and for otherwise finishing the brake shoe and the mechanism for imparting the necessary movements to the same.

In the present embodiment of the invention the turret wheel comprises the main frame 3, which, it will be seen from the illustrations, is somewhat irregular in shape for the reason that it is designed to carry mechanism adapted to receive metallic shells and to retain them while the shells are presented to mechanism which inserts a body or block of filling material in the shell, and to present the shell thus filled to the folding, compressing and finishing mechanism, which last mentioned mechanism forms a part of the present application for Letters Patent.

The mechanism for preparing and inserting the filling material is made the subject of a separate application for Letters Patent, filed of even date herewith.

Attention has already been called to my co-pending application on automatic brake shoe machine and reference may be had to the same for a detailed description of the brake shoe adapted to be operated upon by the present embodiment of this invention.

The turret wheel frame is provided at its periphery with a plurality of vertical faces, each adapted to receive shell supports or holders 4, (see Figs. 12 and 13).

The member 4 presents outwardly a curved surface corresponding to the shape of the back and sides of the completed brake shoe. A movable holder, adjacent to each of these shell carrying members, is mounted on the turret wheel, (see Fig. 15). The brake shoe shells, before being presented to the machine, have their side and end members folded at approximately right angles to the back member. About the middle of the back member of the shell two adjacent lugs or tongues of metal are formed outwardly at approximately right angles to the back member. These lugs or tongues are designed to furnish a means of securing the brake shoe in the ordinary M.C.B. or Christy brake shoe head, and are provided with holes which receive the ordinary retaining key or pin. The relative position of these parts in the holder will be apparent by referring to Fig. 15, in which a broken portion of a brake shoe shell is shown secured into the holder. The holder consists of a bifurcated member 5, the elastically controlled retaining lugs 6 and a reciprocating arm or rod 7 mounted in the turret wheel frame.

The turret wheel frame is mounted for rotation on the vertical spindle or axis 8. A suitable ball bearing 9 is preferably provided for carrying the weight of the wheel at the base of the spindle. The arms or rods 7, carrying the shell holders, are provided at their ends next the center of the turret wheel with anti-friction rollers 10, carried in suitable supporting frames 11. An eccentrically mounted cam 12 is keyed to the stationary spindle 8, (see Figs. 2 and 20). The anti-friction rollers 10 contact with the peripheral surface of this cam and are held in contact with the irregular surface by suitable elastic means as springs 13. This mechanism controlling the shell holding means enables the holder to be properly positioned in the shell retaining means 4 at the time it is desired to insert a brake shoe shell therein and the subsequent withdrawal of the cam surface from the inner end of the controlling rod 7 permits the holder to be withdrawn when it is desired to give the brake shoe shell a curved shape to correspond with the contour of the member 4, which shape corresponds to the curvature ultimately required of a brake shoe to enable it to correspond to the braking surface of a car wheel.

When reference is had to my co-pending application on automatic brake shoe machine, it will be seen that in the present construction of the turret wheel, it is designed to be of sufficient strength to permit the brake shoe shell to be attached to the periphery of the wheel before the shell is given the curvature just referred to and that the filling material is inserted into the shell under sufficient pressure to cause the shell to conform to the curved shape of the matrix or member 4, already described, on the turret wheel. This curved shape is also given to the filler block before being inserted. It will be apparent, however, that the operation of curving the shell and inserting the filling material may be performed by mechanism wholly disconnected from mechanism described in the present application, in which event the shells will be inserted in the matrices or holding members on the turret wheel for the purpose of performing thereupon the operations of bending the side and end members of the shell into contact with the filling material and otherwise securing the filling material in the shell in the manner hereafter described.

The turret wheel spindle carries an eccentrically mounted cam 14, similar to the cam 12 already described, which controls the movements of shell discharge fingers 15 carried in the turret wheel frame 4. These fingers are normally held within the turret wheel frame by elastic means such as spring 16. By reference to Fig. 19, it will be seen that cam 14 is provided with the eccentric surface 14$^a$ which engages the anti-friction roller 18 carried in member 17, which last mentioned member is rigidly secured to discharge member 15, thus causing this last mentioned member to be protruded beyond the surface of members 4, which has the effect of pushing or crowding the completed brakeshoe out of its retaining means on the turret wheel.

In the present embodiment of the invention, a rotating movement is imparted to the turret wheel from the main driving shaft through eccentrically mounted cam 19, reciprocating member 20, link 21, pivoted lever 22, link 23, sliding member 24, a link 25, and the pivoted ratchet lever 26. Near the bottom of the turret wheel, it will be observed that the periphery of the wheel is provided with internal ratchet teeth 3$^a$. Lever 26 is pivoted on the axis of the turret wheel, being journaled over the spindle 8 and carries a suitable engaging pawl 27 provided with one or more teeth adapted to engage teeth 3$^a$ on the turret wheel. Suitable elastic means as spring 28 holds pawl 27 in constant engagement with the turret wheel. It will be observed that the shape of the teeth 3$^a$ will permit the pawl 27 to engage therewith when moving only in one direction, and will permit the sliding of the pawl over the teeth without engaging therewith when swinging arm 26 is moved in the reverse direction. To prevent any possibility of a retrograde movement of the turret wheel due to the friction of pawl 27 during its return movement, one or more suitable stop pawls 29 may be mounted on the main frame to engage the teeth 3ᵃ; such pawls should be provided with suitable elastic means as spring 30 and a suitable retaining frame as 31.

The weight of the turret wheel and the mechanism carried thereby, together with the fact that it is preferably mounted to rotate on anti-friction means, makes it desirable that means be provided to prevent the momentum from carrying the wheel beyond the point of register with the mechanism designed to operate on the material carried thereby. One manner of accomplishing this result is shown and embraces the gear wheel 31ᵃ carried on the main driving shaft. This gear wheel engages with gear 32 mounted on trunnion 33 on the main frame. Cam 34 is secured to gear 33 in any convenient manner as by the means 35 and its irregular peripheral surface is adapted to engage anti-friction roller 36 on plunger 37, which is controlled by spring 38. Link 39 imparts the reciprocating movement of plunger 37 to arm 40 on rock shaft 41. An arm 42 is secured to rock shaft 41 and is preferably mounted thereon to slide laterally, being controlled by suitable buffer spring 43. Suitable engaging surfaces as 3ᵇ are provided near the periphery of the turret wheel and it will be seen that the operation of the mechanism just described will be to effect an upward movement of engaging arm 42, thus causing it to contact with the surfaces 3ᵇ on the turret wheel and to hold the wheel against rotation during the interval that the adjacent mechanisms are operating on brake shoe shells carried thereby. To be more exact in the specific construction shown, arm 42 is held normally in the path of the engaging surfaces 3ᵇ and the movement of plunger 37, in the manner described, releases the turret wheel when it is desired that rotation should be imparted to it. An adjustable stop 43ᵃ is suitably mounted on the main frame to limit the movement of arm 42 when the turret wheel strikes it. Eccentrically mounted cams 44 and 45 are keyed to the main driving shaft and their irregular peripheral surfaces engage the anti-friction rollers mounted on the reciprocating members 46 and 47, which are carried by the main frame. A detailed description of this driving mechanism is not made in the present application, as a full description of the same has been given in my co-pending application already referred to. The essential features of the construction of the compound or double-acting head or ram have also been fully described in my co-pending application on power presses. Rock levers 49 and 50 impart the movement of reciprocating members 46 and 47 through their suitable link connections to the main reciprocating head 51 and to the auxiliary reciprocating head 52. The mechanism carried on heads 51 and 52 is designed to be moved contiguous to the turret wheel and to grasp brake shoe shells carried thereby into which the filling material has been inserted and the side and end walls of the shell already bent at an angle to the back member. A suitable member 53 is firmly secured to head 51 by retaining bolts or lag screws 54. Member 53 carries two or more angular bending dies 55. The action of these dies, as will be apparent by reference to Fig. 27, is to bend the side walls of the shell firmly into contact with the filling material. In Fig. 27 a broken section of a brake shoe being acted upon by die 55 is shown, the side wall of the shell being designated by the numeral 56, the back wall by 57 and the filling material by 58. During the forward movement of main head 51 and the action of bending dies 55 upon the side walls of the brake shoe, the mechanism controlled by auxiliary head 52 is held out of contact with the brake shoe shell. This is accomplished by timing the movement of the driving mechanism controlling member 52 in order to cause it to move synchronously with head 51. When the action of the side bending dies carried on the main head is approximately complete, the operating mechanism controlling auxiliary head 52 is timed to cause it to move forward in relation to head 51. 52 is provided with engaging surfaces 52ᵃ and 52ᵇ near the upper and lower edges of its face adjacent the turret wheel. The member 53 on the main frame carries the pivoted bell cranks 59 and 60, one arm of which carries the anti-friction rollers 61 and 62 in contact with surfaces 52ᵃ and 52ᵇ, the other arm carrying suitable bending dies 63 and 64, which dies are, as will be seen, designed to approach and act upon the end walls of the brake shoe shell, forcing them firmly into contact with the filling material. In the present embodiment of the invention, it is designed to make a brake shoe having a shell of the form fully shown and described in my application on automatic brake shoe machine before referred to, which shell is provided with end walls and with auxiliary end members formed integral with the side members of the shell and adapted to be formed around the exterior of the end walls. In order that the dies 63 and 64 may complete the formation of the auxiliary end walls at one stroke, it is necessary that these auxiliary end members should be bent inwardly to a degree sufficient to allow the dies 63 and 64 to engage them. This result is accomplished by means of the angular bending dies 65, which are similar to the dies 55 already described, and are also likewise carried on member 53 mounted on main head or ram 51.

It is sometimes desirable that the portions of the metal in the side walls of the shell be forced inwardly and embedded firmly in the filling material in order that a more perfect union between the shell and the filling material may be effected. This may be accomplished either by indenting the material or by cutting out small tongues or barbs and forcing the same inwardly and embedding the parts so formed into the filling material. Dies 66 for this purpose, are shown (see Fig. 29) provided with suitable cutting members 66ª. Any desired number of these dies may be provided but in the present embodiment two dies for each side of the shell are shown, each die being provided with three cutting members. Dies 66 are carried at one end of bell cranks 67 and 68, which are pivoted to rock in horizontal planes in the fixed member 53, which is rigidly attached to main head 51. The other end of these bell cranks takes links 69 and 70, which are connected to the auxiliary moving head 52. Thus it will be seen that when the auxiliary head 52 moves forward in relation to main head 51, the dies 66 will be forced against the side walls of the shell and will cut suitable retaining tongues or lugs out of the walls and force one end of them into the filling material.

In the operation of the machine, therefore, it will be seen, that a brake shoe shell, having the side and end walls formed at an angle to the back wall and having the filling material inserted therein, is brought into register with the dies carried on the compound reciprocating head and when in register with such mechanism, the main head moves forward, firmly compressing the side walls of the shell into contact with the filling material and at the same time partially closing the auxiliary supporting end walls. The auxiliary head is then moved forward in relation to the main head, which completes the operation of forming the end walls firmly into contact with the filling material and securing the filling within the shell, as described. It should be remarked that the movement of the auxiliary head 52 is so timed that it begins its return movement before main head 51, which frees dies 66 from the side walls of the shell. When the compound reciprocating head has completely retreated from the shell, the turret wheel is rotated in the manner already described, which immediately brings the shell just completed into a position with relation to cam 14 which causes discharge finger 15 to push or crowd the shell from the turret wheel, whence it may be received in any suitable receptacle or by any suitable conveying means, no description of which is given in this specification, as such means forms no part of the present invention.

In order that the device might be fully understood, the details of an embodiment thereof have been thus specifically described but

What I claim is:—

1. In a brake-shoe machine, the combination with a carrier embodying a revolving frame, a plurality of matrices mounted on the periphery thereof adapted to conform to the back and side walls of the brake-shoe, means adapted to engage brake-shoe shells and to hold them in the said matrices, means adapted to discharge brake-shoes from said matrices and said holding means, and means adapted to move into the path of the carrier and fold the walls of the brake-shoe carried thereby.

2. In a brake-shoe machine, the combination with a movable carrier, a plurality of brake-shoe shell matrices and means adapted to enter the path of movement of said carrier and to engage the walls of brake-shoe shells carried in the said matrices embodying a horizontally moving head or plunger, folding dies carried thereby, and an auxiliary reciprocating head or plunger adapted to actuate said end-folding dies.

3. In a brake-shoe machine, the combination of a movable carrier and brake-shoe shell folding mechanism adapted to enter the path of movement of said carrier and to fold the side and end walls of brake-shoe shells carried thereby, said folding mechanism embodying a main reciprocating head or plunger, a plurality of dies carried thereby and adapted to contact with the side walls of a brake-shoe, an auxiliary head or plunger carried by said main head or plunger and adapted to move independently thereof, and end-folding dies actuated by said auxiliary head.

4. In a brake-shoe machine, the combination of a main frame, a main driving shaft journaled in the main frame adjacent to the lower side thereof, a vertical spindle carried by said frame, a revolving wheel mounted on said spindle, a plurality of teeth on the said wheel, a swinging arm, an elastically controlled pawl carried on said arm and adapted to engage the said teeth and means for imparting movement from said main driving shaft to said swinging arm.

5. In a brake-shoe machine, the combination with a main frame, of a revolving wheel, a plurality of brake-shoe shell matrices carried thereby, means for imparting an intermittent series of movements to said wheel, a plurality of stop surfaces on said wheel, a pivoted member adapted to engage the said stop surfaces, and elastic means interposed between said pivoted member and its support.

6. In a brake-shoe machine, the combination of a carrier, a brake-shoe shell matrix mounted thereon, a reciprocating member mounted in said carrier and having one end thereof contiguous to the surface of said matrix, an elastically controlled shell retaining lug or hook carried by said member and an inclined surface in the path of movement of said carrier adapted to actuate said reciprocating member.

In testimony whereof I have signed my name to this specification, in the presence of two subscribing witnesses, on this 11th day of December, A. D. 1906.

FREDERICK K. CASWELL.

Witnesses:
M. A. CANTWELL,
A. L. SPRINKLE.